US012618266B2

(12) United States Patent
Ver Weyst

(10) Patent No.: US 12,618,266 B2
(45) Date of Patent: May 5, 2026

(54) LOCKING MECHANISM AND ROTATING KEY

(71) Applicant: Ryan Ver Weyst, Hammond, WI (US)

(72) Inventor: Ryan Ver Weyst, Hammond, WI (US)

( * ) Notice: Subject to any disclaimer, the term of this patent is extended or adjusted under 35 U.S.C. 154(b) by 0 days.

(21) Appl. No.: 18/885,459

(22) Filed: Sep. 13, 2024

(65) Prior Publication Data

US 2026/0078608 A1 Mar. 19, 2026

(51) Int. Cl.
*E05B 35/00* (2006.01)

(52) U.S. Cl.
CPC .................................. *E05B 35/005* (2013.01)

(58) Field of Classification Search
CPC ........ E05B 35/14; E05B 35/003; E05B 35/00; E05B 35/005; E05B 35/008; E05B 19/18; E05B 19/0023; E05B 19/0047; E05B 19/0017; E05B 19/0041
See application file for complete search history.

(56) References Cited

U.S. PATENT DOCUMENTS 615,207 A * 11/1898 Babcock ................. E05B 67/18 70/403
3,990,281 A 11/1976 Meter
10,844,631 B2 11/2020 Trupiano
2010/0199731 A1 8/2010 Kofman
2015/0114056 A1* 4/2015 Liao ........................ E05B 19/18 70/344

FOREIGN PATENT DOCUMENTS

| | | | | |
|---|---|---|---|---|
| CA | 2298152 A1 * | 8/2001 | ......... | E05B 27/0078 |
| ES | 2687865 T3 | 10/2018 | | |
| IL | 186219 | 1/2008 | | |
| JP | 2014-181472 A | 9/2014 | | |

* cited by examiner

*Primary Examiner* — Christine M Mills
*Assistant Examiner* — Christopher F Callahan
(74) *Attorney, Agent, or Firm* — Foley & Lardner LLP

(57) ABSTRACT

A lock system includes a swing latch, one or more pins, and a channel. The swing latch includes a latch arm having a keyed profile at a first end and a swing bar extending from a second end. The one or more pins have a hook portion and a peg portion. The hook portion defines an aperture. The hook portion is configured to engage the swing bar and the aperture is configured to release the swing bar. The channel is configured to accommodate a rotational movement of the swing latch, such that, responsive to the aperture aligning with the swing bar, the swing latch is permitted to rotate through the channel.

20 Claims, 6 Drawing Sheets

LOCKING MECHANISM AND ROTATING KEY

BACKGROUND

The present disclosure relates generally to the field of locking mechanisms. Traditional locks employ a key and lock cylinder system, where the key's unique configuration determines the unlocking sequence. It would be advantageous to integrate mechanisms that resist forced entry, manipulation, and other unauthorized methods of access, while allowing authorized users to easily unlock and relock the mechanism as needed.

SUMMARY

One embodiment of the present disclosure relates to a lock system. The lock system includes a swing latch, one or more pins, and a channel. The swing latch includes a latch arm having a keyed profile at a first end and a swing bar extending from a second end. The one or more pins have a hook portion and a peg portion. The hook portion defines an aperture. The hook portion is configured to engage the swing bar and the aperture is configured to release the swing bar. The channel is configured to accommodate a rotational movement of the swing latch, such that, responsive to the aperture aligning with the swing bar, the swing latch is permitted to rotate through the channel.

Another embodiment of the present disclosure relates to a lock system. The lock system includes a key. The key includes a bow, a shaft extending from the bow where the shaft has a keyed profile at a free end thereof, a sleeve rotatably coupled around the shaft, and a keyed blade extending from the sleeve.

Another embodiment of the present disclosure relates to a key-operated lock system. The key-operated lock system includes a key and a lock assembly. The key includes a shaft having a first keyed profile and a sleeve disposed around the shaft where the sleeve includes a keyed blade. The lock assembly includes a plurality of pins and a swing latch. Each of the plurality of pins has a top portion and bottom portion. The top portion defines an aperture. The swing latch includes a second keyed profile and a swing bar configured to engage with the top portion of the plurality of pins. When the key is inserted into the lock assembly, (a) the keyed blade engages with the bottom portion of the plurality of pins to lift the plurality of pins to align the apertures with the swing bar and (b) the first keyed profile of the shaft engages with the second keyed profile of the swing latch to facilitate rotating the swing latch to unlock the lock assembly.

This summary is illustrative only and is not intended to be in any way limiting. Other aspects, inventive features, and advantages of the devices or processes described herein will become apparent based on the detailed description set forth herein, taken in conjunction with the accompanying drawings.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Below are more detailed descriptions of various concepts related to and implementations of methods, apparatuses, and systems associated with the embodiments introduced above. The illustrative embodiments described herein are not meant to be limiting. Other embodiments may be utilized, and other changes may be made, without departing from the spirit or scope of the subject matter presented herein. It will be readily understood that the aspects of the present disclosure, as generally described herein and illustrated in the figures, can be arranged, substituted, combined, and designed in a wide variety of different configurations, all of which are explicitly contemplated and made part of this disclosure.

Figure 1:
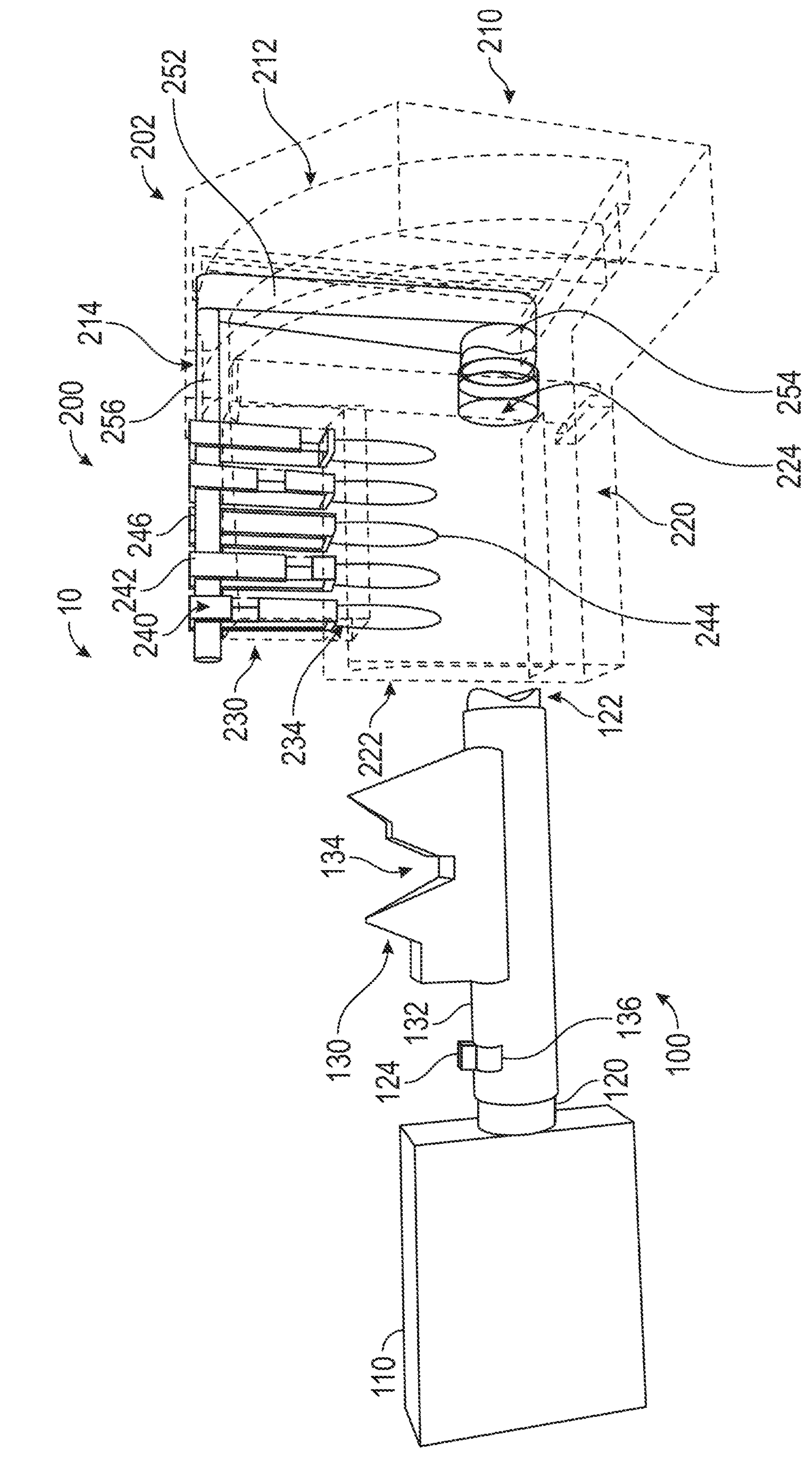
FIG. 1 is a perspective view of a key and a lock in a locked configuration, according to an exemplary embodiment.
Figure 2:
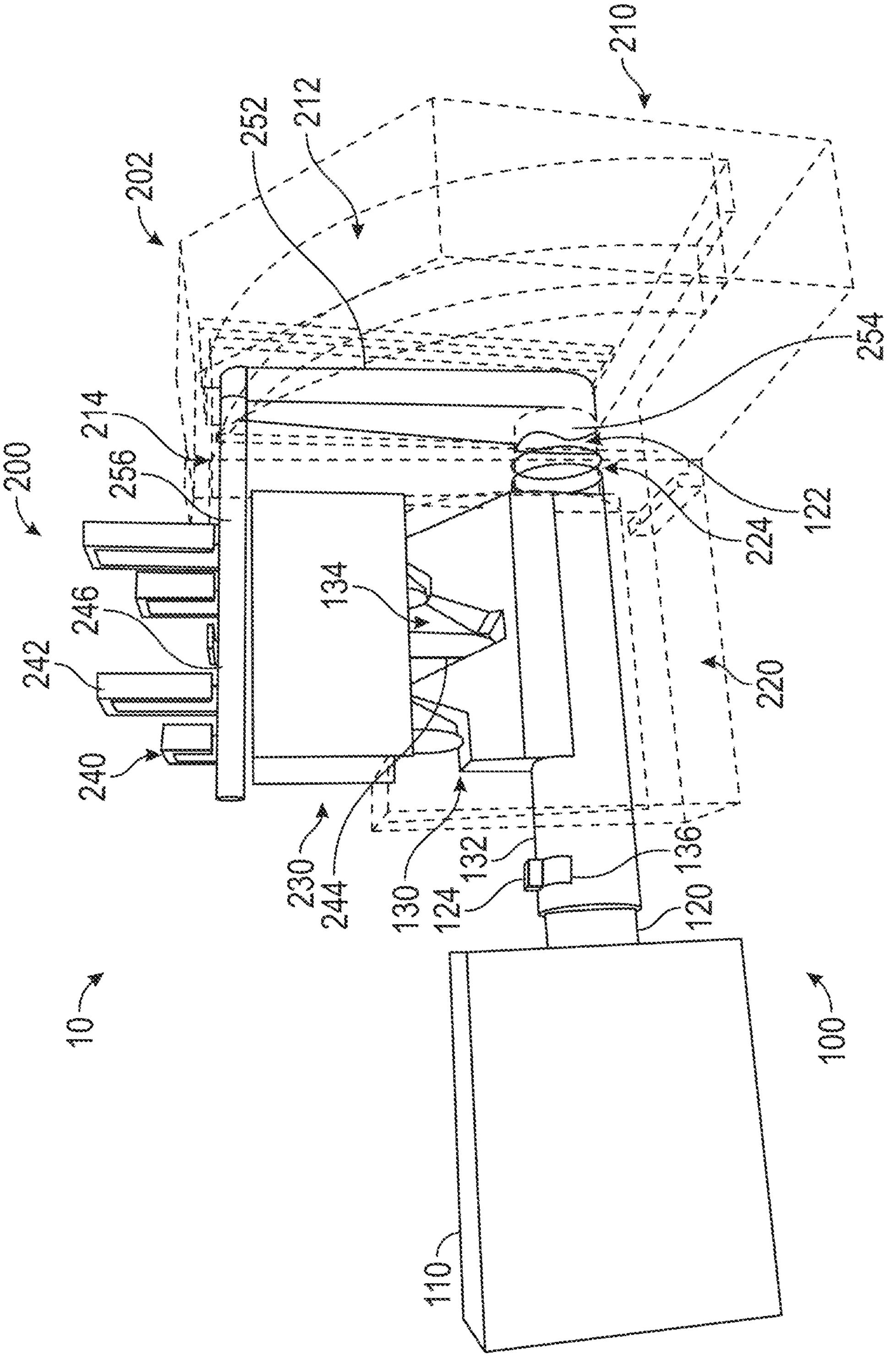
FIG. 2 is a perspective view of the key inside of the lock with the key in a first configuration and the lock in a partially unlocked configuration, according to an exemplary embodiment.
Figure 3:
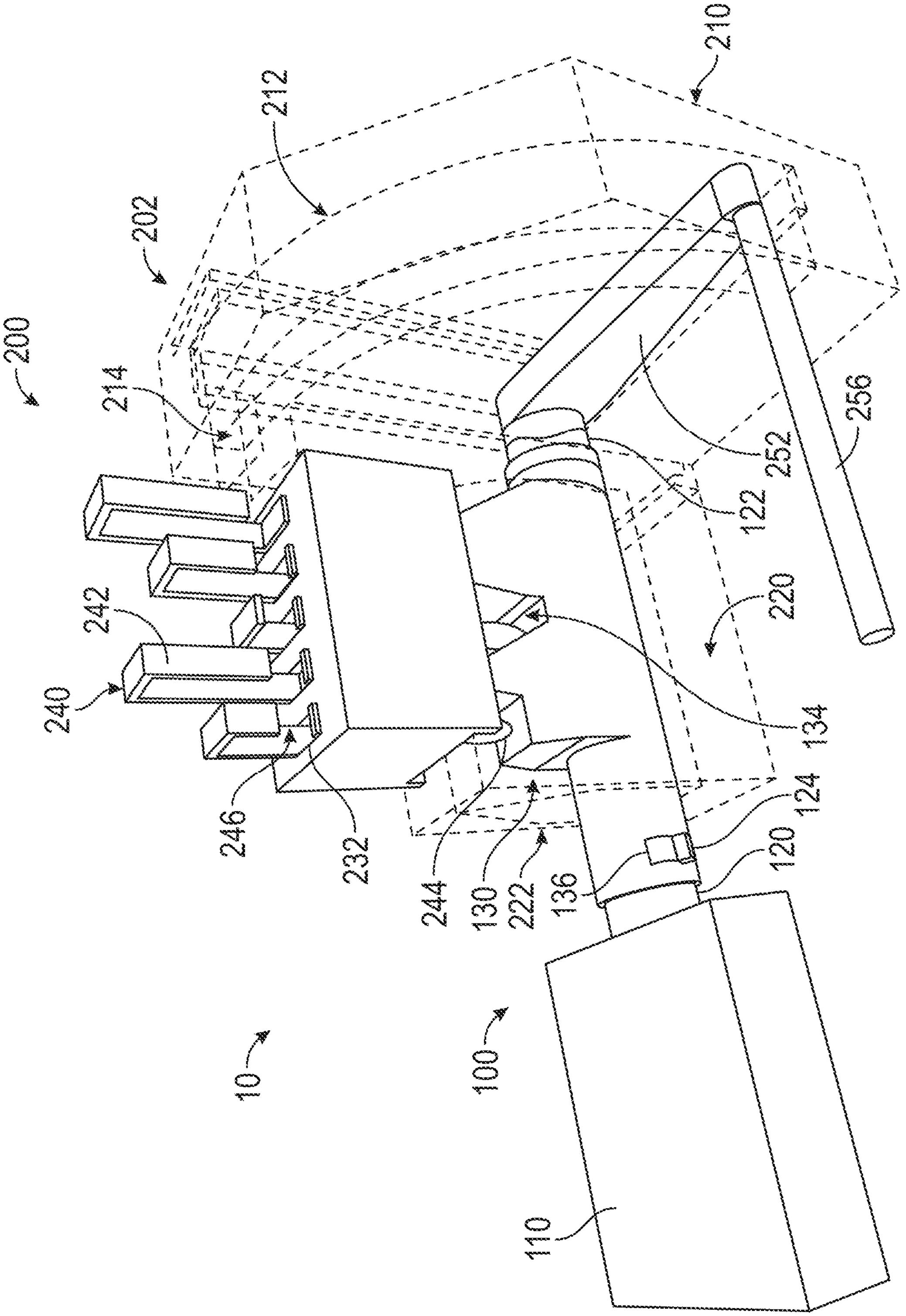
FIG. 3 is a perspective view of the key inside of the lock with the key in a second configuration and the lock in an unlocked configuration, according to an exemplary embodiment.

As shown in FIGS. 1-3, a lock system 10 includes a multi-component key (e.g., a two-component key), shown as key 100, and a locking mechanism, shown as lock 200. As shown in FIGS. 1-4, the key 100 includes a first handle portion, shown as bow 110, a second, inner keyed portion, shown as keyed shaft 120, extending from the bow 110, and a third, outer keyed portion, shown as keyed blade 130, rotatably disposed along the keyed shaft 120. According to an exemplary embodiment, the bow 110 is configured to permit an operator of the lock system 10 to hold the key 100 and insert the key 100 into the lock 200 and turn the key 100 therein, as described in greater detail herein.

As shown in FIGS. 1-4, the keyed shaft 120 has a cylindrical structure that extends perpendicularly from the bow 110. A free end of the keyed shaft 120 opposite the bow 110 includes or defines a first unique interface (e.g., ridges, curved waves, a keyed face, etc.), shown as keyed profile 122. The keyed shaft 120 includes a retainer, shown as tab 124, protruding or extending laterally outward therefrom. In some embodiments, the tab 124 is fixed to the keyed shaft 120. In some embodiments, the tab 124 is detachable from the keyed shaft 120 (e.g., via a screw-thread interface to permit selective removal of the keyed blade 130 therefrom, etc.). In some embodiments, the tab 124 is a spring-biased element that can be selectively depressed into the keyed shaft 120 and biased outward by a spring (e.g., to permit selective removal of the keyed blade 130 therefrom).

As shown in FIGS. 1-4, the keyed blade 130 includes a tubular component, shown as sleeve 132, that interfaces with (e.g., slides onto, is disposed around, etc.) and rotates about the keyed shaft 120. The keyed blade 130 includes or defines (a) a second unique interface, shown as keyed profile 134, and (b) a slot, shown as tab guide 136. The keyed profile 134 includes a unique set of teeth. The teeth define a pattern of peaks and valleys (i.e., cuts and bittings). In some embodiments, the keyed profile 134 is integrally formed with the sleeve 132. In such embodiments, the keyed blade 130 may be swapped or interchanged with another sleeve-keyed blade 130 to facilitate reconfiguring the key 100 (see, e.g., FIG. 4). In some embodiments, the keyed profile 134 is detachably coupled to the sleeve 132 such that the keyed profile 134 may be interchangeable with other keyed profiles 134 to facilitate reconfiguring the key 100. As shown in FIGS. 1-4, the tab guide 136 of the sleeve 132 is configured to align with and receive the tab 124 of the keyed shaft 120, longitudinally securing the keyed blade 130 along the keyed shaft 120 while permitting partial rotation (e.g., 90 degree rotation) of the keyed shaft 120 relative to the keyed blade 130 (i.e., when the keyed shaft 120 is rotated, the tab 124 translates within and along the tab guide 136 between the ends thereof).

As shown in FIGS. 1-3, the lock 200 includes a main housing, shown as lock housing 202, that encloses a locking assembly (e.g., pins, a swing latch, gears, etc.) including one or more retainers, shown as pins 240, and a locking arm, shown as swing latch 250. The lock housing 202 has a first housing portion, shown as swing latch housing 210, a second housing portion, shown as key housing 220, extending forward from and perpendicular to the swing latch housing 210, and a third housing portion, shown as pin housing 230, disposed along and above the key housing 220. The swing latch housing 210 defines an internal guide, shown as latch channel 212, and an aperture, shown as slot 214, extending through a face of the swing latch housing 210 to the latch channel 212. A first end of the key housing 220 defines an external opening, shown as keyhole 222. An opposing second end of the key housing 220 and the swing latch housing 210 cooperatively define a passage, shown as keyed shaft aperture 224, leading from the key housing 220 into the swing latch housing 210. As shown in FIG. 3, an upper end of the pin housing 230 defines one or more first pin apertures, shown as upper pin apertures 232. As shown in FIG. 1, a lower end of the pin housing 230 and an upper end of the key housing 220 cooperatively define one or more second pin apertures, shown as lower pin apertures 234, leading from the pin housing 230 into the key housing 220.

As shown in FIGS. 1-3, each of the pins 240 has a first, upper portion, shown as hook portion 242, and a second, bottom portion, shown as peg portion 244. The hook portions 242 extend through the upper pin apertures 232 and the peg portions 244 extend through the lower pin apertures 234 into the key housing 220. Each of hook portions 242 defines an aperture, shown as latch shaft aperture 246, variously positioned along a length of the hook portion 242 such that the position of the latch shaft aperture 246 varies between at least some of the pins 240.

As shown in FIGS. 1-3, the swing latch 250 includes a body, shown as latch arm 252, disposed within the swing latch housing 210. The latch arm 252 has (a) a first, lower end that includes a second unique interface (e.g., ridges, curved waves, a keyed face, etc.), shown as keyed profile 254, extending/protruding therefrom (or, alternatively, defined or recessed therein) and in alignment with the keyed shaft aperture 224 and (b) a second, upper end that includes a bar, shown as swing bar 256, extending through the slot 214 and selectively received within and retained by the hook portions 242 of the pins 240.

As shown in FIG. 2, when the key 100 is inserted into the key housing 220 through the keyhole 222, (a) the keyed profile 134 of the keyed blade 130 engages with the peg portions 244 of the pin 240 and (b) the keyed profile 122 of the keyed shaft 120 extends through the keyed shaft aperture 224 and engages with the keyed profile 254 of the swing latch 250. The engagement between the keyed profile 134 of the keyed blade 130 and the peg portions 244 of the pins 240 causes the pins 240 to variably lift or elevate through the upper pin apertures 232 of the pin housing 230 based on the shape of the keyed profile 134 such that the latch shaft apertures 246 of the hook portions 242 of the pins 240 align and, therefore, permit the swing bar 256 to freely rotate through the latch shaft apertures 246 and disengage from the hook portions 242 of the pins 240 to unlock the lock 200. According to an exemplary embodiment, the keyed profile 134 of the key 100, the relative positioning of the pins 240 along the pin housing 230, and the positioning of the latch shaft apertures 246 on each of the pins 240 are unique to the lock system 10. In this way, the keyed profile 134 of the keyed blade 130 must correspond with the positioning of the latch shaft apertures 246 of the hook portions 242 of the pins 240 and the positioning of the pins 240 along the pin housing 230 to unlock or lock the lock 200.

As shown in FIGS. 2 and 3, with (a) the keyed profile 134 of the keyed blade 130 in engagement with the peg portions 244 of the pins 240 and (b) the keyed profile 122 of the keyed shaft 120 in engagement with the keyed profile 254 of the swing latch 250, the bow 110 may be turned or rotated by the user such that the keyed shaft 120 rotates within and relative to the keyed blade 130. As shown in FIG. 3, the engagement of the keyed profile 122 of the keyed shaft 120 with the keyed profile 254 of the swing latch 250 causes the latch arm 252 to rotate with the keyed shaft 120 such that the swing bar 256 disengages from the pins 240 and moves within the latch channel 212 to reconfigure the lock 200 from the lock configuration as shown in FIGS. 1 and 2 and the unlocked configuration shown in FIG. 3. Rotating the swing bar 256 away from the pins 240 causes the lock 200 to define an unlocked position. When in the unlocked configuration, the keyed blade 130 remains in an upright orientation, while the bow 110 and the keyed shaft 120 are rotated relative thereto (e.g., ninety degrees). According to an exemplary embodiment, the keyed profile 122 of the key 100 and the keyed profile 254 of the swing latch 250 are unique to the lock system 10. In this way, the keyed profile 122 of the keyed shaft 120 must correspond with the keyed profile 254 of the swing latch 250 to lock or unlock the lock 200. In some embodiments, the keyed profile 122 of the key 100 and the keyed profile 254 of the swing latch 250 are common across two or more of the lock systems 10.

As shown in FIGS. 2 and 3, as the bow 110 is turned or rotated by the user, the tab 124 of the keyed shaft 120 translates along the tab guide 136 of the keyed blade 130. In some embodiments, the tab 124 is biased towards a nominal orientation along the tab guide 136 such that the bow 110 and the keyed profile 134 of the keyed blade 130 are biased into vertical alignment. By way of example, movement of the tab 124 within the tab guide 136 may compress a spring (e.g., a torsion spring). Once the user stops applying rotational force to the bow 110, the spring may bias the tab 124 along the tab guide 136 and, therefore, the key 100 back into the nominal position (e.g., the position shown in FIG. 2). While the keyed profile 122 of the keyed shaft 120 is engaged with the keyed profile 254 of the swing latch 250, the return of the key 100 to the nominal position also rotates the swing latch 250 back to the top of the latch channel 212 such that the swing bar 256 re-engages with the pins 240. The user may then remove the key 100, causing the pins 240 to fall downwards to return the lock 200 to the locked configuration. However, should the key 100 be removed while the lock 200 is in the unlocked configuration, as shown in FIG. 3, the swing latch 250 remains in the position shown in FIG. 3, and the lock 200 remains in the unlocked configuration.

Figure 4:
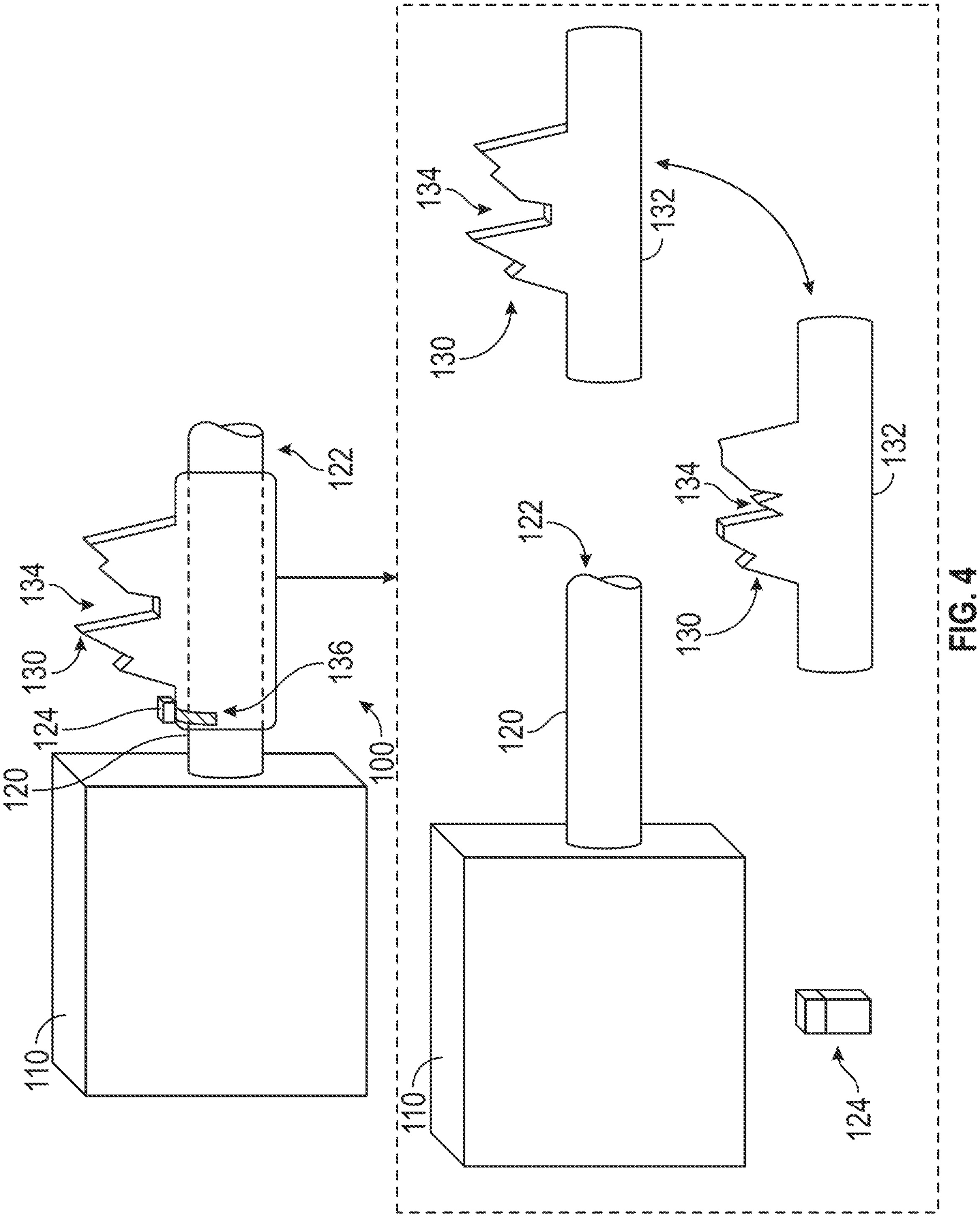
FIG. 4 is an exploded view of the key and its component parts, according to an exemplary embodiment.

Referring now to FIG. 4, an exploded view of the key 100 and its component parts are shown, according to an exemplary embodiment. As discussed above, the key 100 includes the bow 110 with the keyed shaft 120. The keyed blade 130 is removably coupled to the keyed shaft 120. In some embodiments, the tab 124 and tab guide 136 facilitate coupling the keyed blade 130 to the keyed shaft 120. In other embodiments, the keyed blade 130 coupled to the keyed shaft 120 by a variety of means other means, such as magnets, a cammed profile, or other similar means that detachably and rotationally couple the keyed blade 130 to the keyed shaft 120. Accordingly, a first keyed blade 130 may be replaced or changed out for a second keyed blade 130 having a different keyed profile 134. In other embodiments, the keyed profile 134 may be detachably coupled to the sleeve 132 (e.g., via magnets, fasteners, a snap-fit engagement, sliding retention fit, etc.) such that a first keyed profile 134 may be replaced or changed out for a second, different keyed profile 134. With the key 100 having a different keyed profile 134, the pins 240 can be repositioned and/or replaced with different pins 240 to correspond with the different keyed profile 134. Accordingly, a user can "re-key" the lock system 10 by interchanging pins 240 and key profiles 134.

Figure 5:
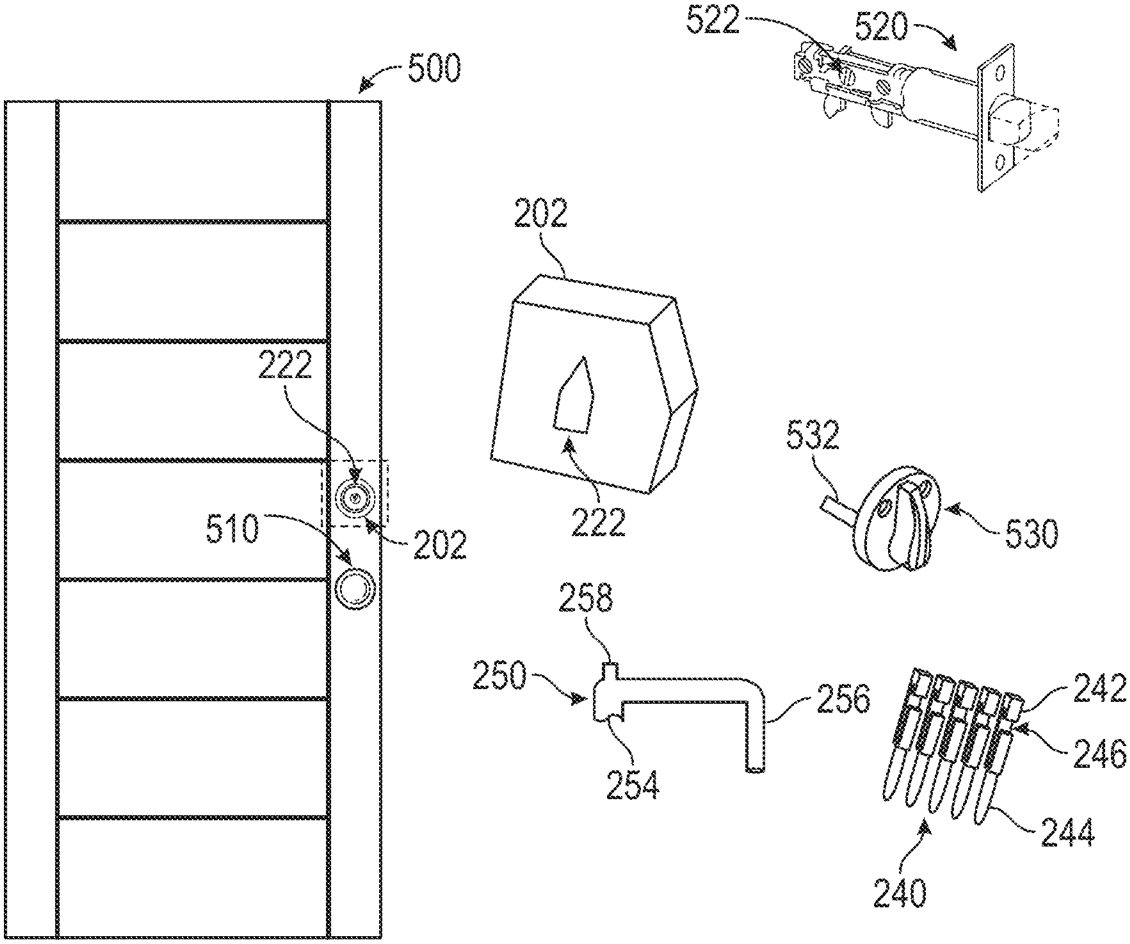
FIG. 5 is a view of the lock implemented in a door along with a deadbolt, according to an exemplary embodiment.

As shown in FIG. 5, the lock 200 is installed in a door 500 including a doorknob 510, a deadbolt assembly 520, and a thumb turn 530. In some embodiments, at least a portion of the lock housing 202 of the lock 200 is disposed within the door 500. As shown in FIG. 5, the swing latch 250 includes a deadbolt interface, shown as cam bar 258, that extends or protrudes from the latch arm 252 in an opposing direction of the keyed profile 254. According to an exemplary embodiment, the cam bar 258 is configured to interface with a cam slot 522 in the deadbolt assembly 520. An opposing side of the cam slot 522 of the deadbolt assembly 520 may receive a cam bar 532 extending from the back of the thumb turn 530. In some embodiments, the same cam slot 522 receives the cam bar 258 of the swing latch 250 and the cam bar 532 of the thumb turn 530. Accordingly, the deadbolt assembly 520 may be extended and retracted via the lock 200 and/or the thumb turn 530 to lock and unlock the door 500.

As discussed above, when a user inserts the key 100 into the lock 200, the keyed profile 122 of the keyed shaft 120 mates with the keyed profile 254 of the swing latch 250. As the keyed shaft 120 and swing latch 250 rotate, the cam bar 258 of the swing latch 250 rotates therewith. Therefore, the cam bar 258 rotates within the cam slot 522 of the deadbolt assembly 520, driving the deadbolt assembly 520 to lock and unlock the door 500. Also, as the cam bar 258 rotates within the cam slot 522, the cam bar 532 of the thumb turn 530 is rotatably engaged to move the thumb turn 530 between a first position (e.g., corresponding to the locked position) and a second position (e.g., corresponding to an unlocked position). Although the lock system 10 is shown as being implemented as a door lock for the door 500 in FIG. 5, the lock system 10 may be implemented with other lock applications that would be appreciated by one having ordinary skill in the art (e.g., a pad lock, a safe, a keysafe, a mailbox, a lock box, etc.).

Figure 6:
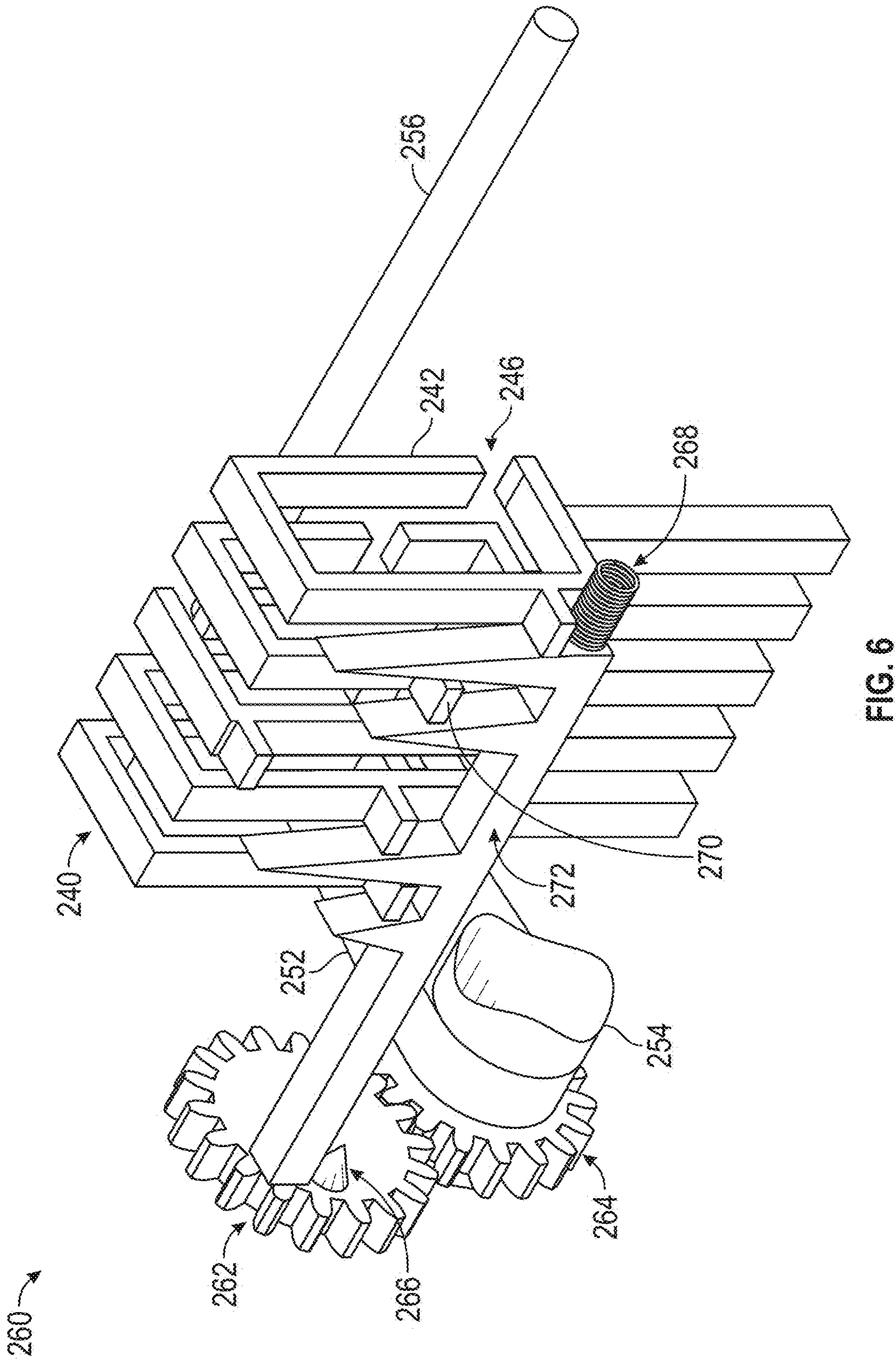
FIG. 6 is a perspective view of an internal locking mechanism of the lock, according to an exemplary embodiment.

As shown in FIG. 6, the locking assembly of the lock 200 includes an internal locking mechanism 260. In exemplary embodiments, the internal locking mechanism 260 is disposed within the pin housing 230. The internal locking mechanism 260 includes a first gear and a second gear, shown as bottom gear 264 and top gear 262. Additionally, the internal locking mechanism 260 is shown to include a keyed blade 272 coupled to a spring 268 at an end opposite the gears 262, 264. In exemplary embodiments, the keyed blade 272 is connected via the spring 268 to the lock housing 202. In exemplary embodiments, the bottom gear 264 and the top gear 262 are rotatably coupled to one another by meshing teeth. The bottom gear 264 is coupled to the latch arm 252 on an opposing side of the keyed profile 254 (e.g., a rear side). In some embodiments, the top gear 262 includes a tapered member 266 (e.g., conical, rounded, etc.). In some embodiments, the gears 262, 264 are rotatably coupled to a thumb turn (e.g., the thumb turn 530 shown in FIG. 5). The tapered member 266 is aligned with the keyed blade 272, such that the tapered member 266 engages with the keyed blade 272 upon rotation of the top gear 262. In this example, the pins 240 include a set of pegs 270 on a rear side of the hook portions 242, opposite the latch shaft apertures 246.

In an example, the pegs 270 on the rear side of the pins 240 correspond to/are in line with the latch shaft apertures 246. In this way, the keyed blade 272 may move the pins 240 by engaging the pegs 270 to align the latch shaft apertures 246 with the swing bar 256. For example, a user may enter through the door 500 of FIG. 5 and relock the lock 200 using a thumb turn 530 on the inner side of the door 500. In this example, the thumb turn 530 rotates the top gear 262 clockwise. As the top gear 262 rotates, the tapered member 266 engages with the keyed blade 272 to push the keyed blade 272 away from the gears 262, 264, thereby compressing the spring 268. As the keyed blade 272 is pushed away from the gears 262, 264, it engages with the pegs 270 on the rear side of the pins 240 to shift the pins 240 along the peaks of the keyed blade 272, thereby aligning the latch shaft apertures 246 into a substantially straight line. Simultaneously, the teeth of the top gear 262 mesh with the teeth of the bottom gear 264, causing the bottom gear 264 to rotate counterclockwise. The bottom gear 264 rotates the swing latch 250 counterclockwise, towards the pins 240. In this way, the swing bar 256 moves inside the hook portions 242 of the pins 240 through the aligned latch shaft apertures 246. In an example, the latch shaft apertures 246 align when the thumb turn is substantially vertical. As the thumb turn 530 rotates to the locked position, the tapered member 266 moves aside the keyed blade 272, releasing the spring 268 from its compressed position. The spring 268, upon moving from the compressed position to a neutral position, moves the keyed blade 272 back towards the gears 262, 264. This, in turn, causes the keyed blade 272 to disengage the pegs 270, thereby allowing the pins 240 to fall downward around the swing bar 256 to return the lock 200 to the locked configuration.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate, resulting in a narrower definition than the generic definition of "coupled" provided above). Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein.

The invention claimed is:

1. A lock system comprising:
- a swing latch including a latch arm having a keyed profile at a first end and a swing bar extending from a second end;
- one or more pins having a hook portion and a peg portion, the hook portion defining an aperture, wherein the hook portion is configured to engage the swing bar and the aperture is configured to release the swing bar; and
- a channel configured to accommodate a rotational movement of the swing latch, such that, responsive to the aperture aligning with the swing bar, the swing latch is permitted to rotate through the channel;
- wherein at least one of:
  - (a) the lock system further comprises a key configured to lift the one or more pins to align the aperture with the swing bar and rotate the swing latch, the key including a shaft with a sleeve rotatable about the shaft, the sleeve having a first keyed blade;
  - (b) the swing latch includes a cam bar positioned proximate the first end of the latch arm, opposite the keyed profile; or
  - (c) the lock system further comprises an internal locking mechanism including:
    - a second keyed blade coupled with a spring,
    - a first gear coupled with the swing latch and positioned opposite the keyed profile,
    - a second gear rotatably engaged with the first gear, wherein rotation of the first gear causes rotation of the swing latch and the second gear; and
    - a tapered member coupled to the second gear, the tapered member configured to push the second keyed blade to compress the spring.

2. The lock system of claim 1, further comprising the key configured to lift the one or more pins to align the aperture with the swing bar and rotate the swing latch.

3. The lock system of claim 2, wherein the key includes the shaft with the sleeve rotatable about the shaft, the sleeve having the first keyed blade.

4. The lock system of claim 3, wherein the keyed profile is a first keyed profile, wherein a free end of the shaft defines a second keyed profile, and wherein the second keyed profile of the shaft is configured to engage with the first keyed profile of the swing latch.

5. The lock system of claim 3, wherein the first keyed blade is configured to engage with the peg portion of the one or more pins to lift the one or more pins and align the aperture with the swing bar.

6. The lock system of claim 3, wherein the sleeve is removable from the shaft.

7. The lock system of claim 1, wherein the swing latch includes the cam bar positioned proximate the first end of the latch arm, opposite the keyed profile.

8. The lock system of claim 7, wherein the cam bar is configured to rotatably engaged with a deadbolt assembly such that rotation of the swing latch causes translation of the deadbolt assembly.

9. The lock system of claim 1, further comprising a lock housing, the lock housing having a first housing portion and a second housing portion, the second housing portion extending perpendicularly from the first housing portion.

10. The lock system of claim 9, wherein the channel is disposed in the first housing portion.

11. The lock system of claim 9, wherein the one or more pins and a portion of the swing bar are disposed in the second housing portion.

12. The lock system of claim 1, further comprising the internal locking mechanism including:
- the second keyed blade coupled with the spring,
- the first gear coupled with the swing latch and positioned opposite the keyed profile,
- the second gear rotatably engaged with the first gear, wherein rotation of the first gear causes rotation of the swing latch and the second gear; and
- the tapered member coupled to the second gear, the tapered member configured to push the second keyed blade to compress the spring.

13. The lock system of claim 12, further comprising one or more pegs coupled with a rear side of the hook portion of the one or more pins, the one or more pegs positioned in line with the aperture of the hook portion, wherein the keyed blade, responsive to being pushed by the tapered member, is configured to engage with the one or more pegs to align the aperture of the hook portion with the swing bar.

14. A lock system comprising:
- a key including:
- a bow;
- a shaft extending from the bow, the shaft having a keyed profile at a free end thereof;

a sleeve rotatably coupled around the shaft; and a keyed blade extending from the sleeve;

wherein at least one of:

(a) the sleeve is a first sleeve and the keyed blade is a first keyed blade, wherein the first sleeve is removable from the shaft, further comprising a second sleeve with a second keyed blade that is different from the first keyed blade, wherein the second sleeve is configured to replace the first sleeve;

(b) the first keyed blade is removable from the sleeve and the second keyed blade is configured to replace the first keyed blade;

(c) the sleeve defines a slot, wherein the shaft includes a tab received in the slot, and wherein the slot permits partial rotation of the tab and, therefore, the shaft relative to the sleeve; or (d) the keyed profile is a first keyed profile and the lock system further comprising a lock including:

a swing latch including a latch arm having a second keyed profile at a first end and a swing bar extending from a second end; and one or more pins having a hook portion and a peg portion, the hook portion defining an aperture, wherein the hook portion is configured to engage the swing bar and the aperture is configured to release the swing bar;

wherein the keyed blade is configured to lift the one or more pins to align the aperture with the swing bar and the first keyed profile is configured to engage with the second keyed profile to facilitate rotating the swing latch to release the swing bar from the one or more pins to unlock the lock.

15. The lock system of claim 14, wherein the sleeve is the first sleeve and the keyed blade is the first keyed blade, wherein the first sleeve is removable from the shaft, further comprising the second sleeve with the second keyed blade that is different from the first keyed blade, wherein the second sleeve is configured to replace the first sleeve.

16. The lock system of claim 14, wherein the keyed blade is the first keyed blade, wherein the first keyed blade is removable from the sleeve, further comprising the second keyed blade that is different from the first keyed blade, wherein the second keyed blade is configured to replace the first keyed blade.

17. The lock system of claim 14, wherein the sleeve defines the slot, wherein the shaft includes the tab received in the slot, and wherein the slot permits partial rotation of the tab and, therefore, the shaft relative to the sleeve.

18. The lock system of claim 17, further comprising a spring positioned to bias the tab, wherein the tab compresses the spring upon rotation of the shaft relative to the sleeve.

19. The lock system of claim 14, wherein the keyed profile is the first keyed profile, further comprising the lock including:

the swing latch including the latch arm having the second keyed profile at the first end and the swing bar extending from the second end; and the one or more pins having the hook portion and the peg portion, the hook portion defining the aperture, wherein the hook portion is configured to engage the swing bar and the aperture is configured to release the swing bar;

wherein the keyed blade is configured to lift the one or more pins to align the aperture with the swing bar and the first keyed profile is configured to engage with the second keyed profile to facilitate rotating the swing latch to release the swing bar from the one or more pins to unlock the lock.

20. A key-operated lock system comprising:

a key including:

a shaft having a first keyed profile; and a sleeve disposed around the shaft, the sleeve including a keyed blade; and a lock assembly including:

a plurality of pins, each of the plurality of pins having a top portion and bottom portion, the top portion defining an aperture; and a swing latch including:

a second keyed profile; and a swing bar configured to engage with the top portion of the plurality of pins;

wherein, when the key is inserted into the lock assembly, (a) the keyed blade engages with the bottom portion of the plurality of pins to lift the plurality of pins to align the apertures with the swing bar and (b) the first keyed profile of the shaft engages with the second keyed profile of the swing latch to facilitate rotating the swing latch to unlock the lock assembly.

* * * * *